United States Patent
Bruer et al.

(10) Patent No.: US 9,955,626 B2
(45) Date of Patent: May 1, 2018

(54) ADJUSTABLE PLANTER BAR SYSTEM

(71) Applicant: American Made Equipment Inc., Eldora, IA (US)

(72) Inventors: Dusko Bruer, Eldora, IA (US); Timothy J. Manning, Eldora, IA (US)

(73) Assignee: AMERICAN MADE EQUIPMENT INC., Eldora, IA (US)

( * ) Notice: Subject to any disclaimer, the term of this patent is extended or adjusted under 35 U.S.C. 154(b) by 244 days.

(21) Appl. No.: 14/634,076

(22) Filed: Feb. 27, 2015

(65) Prior Publication Data

US 2015/0245557 A1 Sep. 3, 2015

Related U.S. Application Data

(60) Provisional application No. 61/946,453, filed on Feb. 28, 2014.

(51) Int. Cl.
| | | |
|---|---|---|
| *A01C 7/20* | (2006.01) | |
| *A01C 23/00* | (2006.01) | |
| *A01B 39/22* | (2006.01) | |
| *A01C 7/08* | (2006.01) | |

(52) U.S. Cl.
CPC .............. *A01C 7/208* (2013.01); *A01B 39/22* (2013.01); *A01C 7/081* (2013.01); *A01C 23/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,781,733 A | * | 2/1957 | Graham | A01C 23/025 111/123 |
| 3,011,235 A | * | 12/1961 | Pacheco | A01B 35/225 172/776 |
| 4,117,889 A | * | 10/1978 | Larson | A01B 69/004 104/244.1 |
| 4,930,581 A | * | 6/1990 | Fleischer | A01B 69/004 172/191 |
| 4,961,681 A | * | 10/1990 | Threatt | B66F 9/12 294/93 |
| 5,476,147 A | | 12/1995 | Fixemer | |
| 6,494,154 B2 | * | 12/2002 | Kinzenbaw | A01C 7/208 111/54 |
| 2009/0007828 A1 | | 1/2009 | Johnson | |

FOREIGN PATENT DOCUMENTS

| | | |
|---|---|---|
| RU | 2061349 | 6/1996 |
| RU | 2243635 | 1/2005 |

* cited by examiner

*Primary Examiner* — Alicia Torres
(74) *Attorney, Agent, or Firm* — Duane Morris LLP; J. Rodman Steele, Jr.; Gregory M. Lefkowitz

(57) ABSTRACT

An adjustable planter bar for a multi-row planter generally comprises a horizontal support bar, a first plate member coupled to a trailing side of the support bar, and a second plate member coupled to a leading side of the support bar. The first plate member can form an upper, trailing rail extending above the trailing side of the support bar.

16 Claims, 19 Drawing Sheets

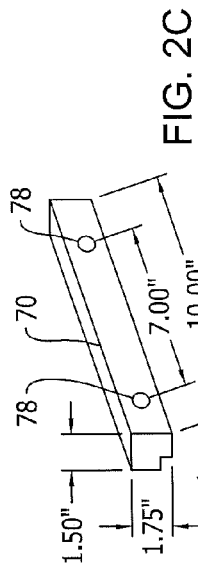
FIG. 2C
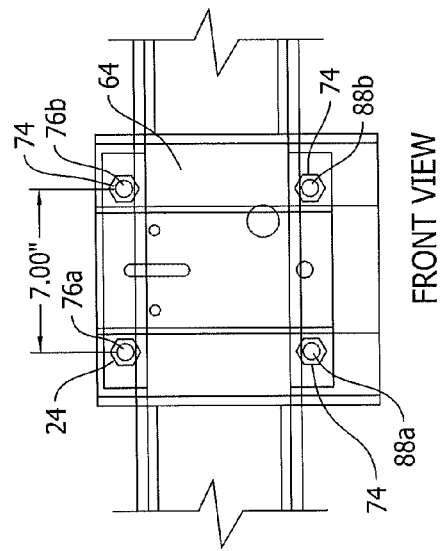
FIG. 2D FRONT VIEW
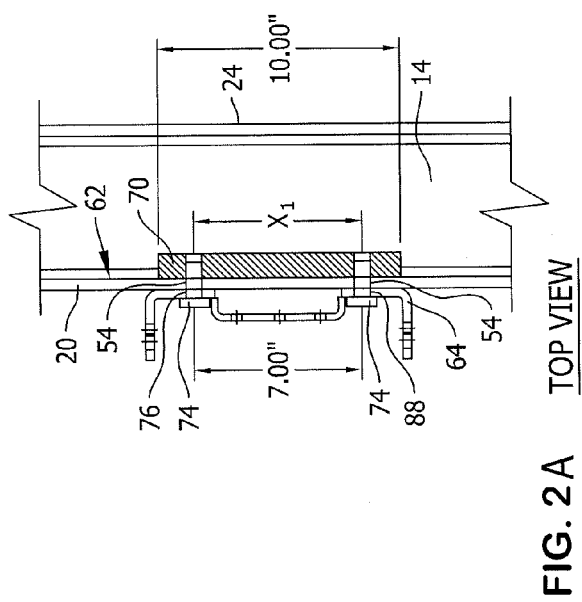
FIG. 2A TOP VIEW
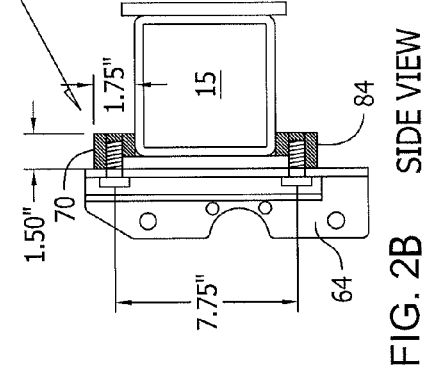
FIG. 2B SIDE VIEW

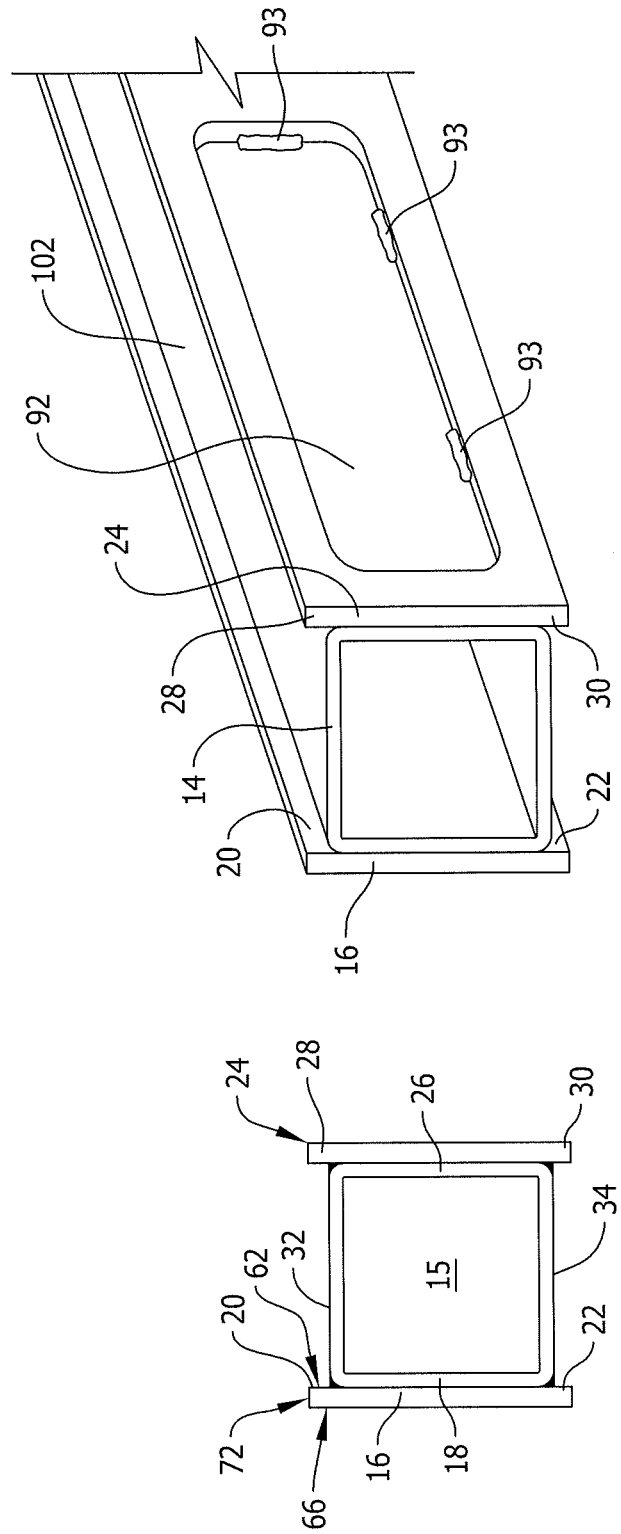

PLAN VIEW

SIDE VIEW

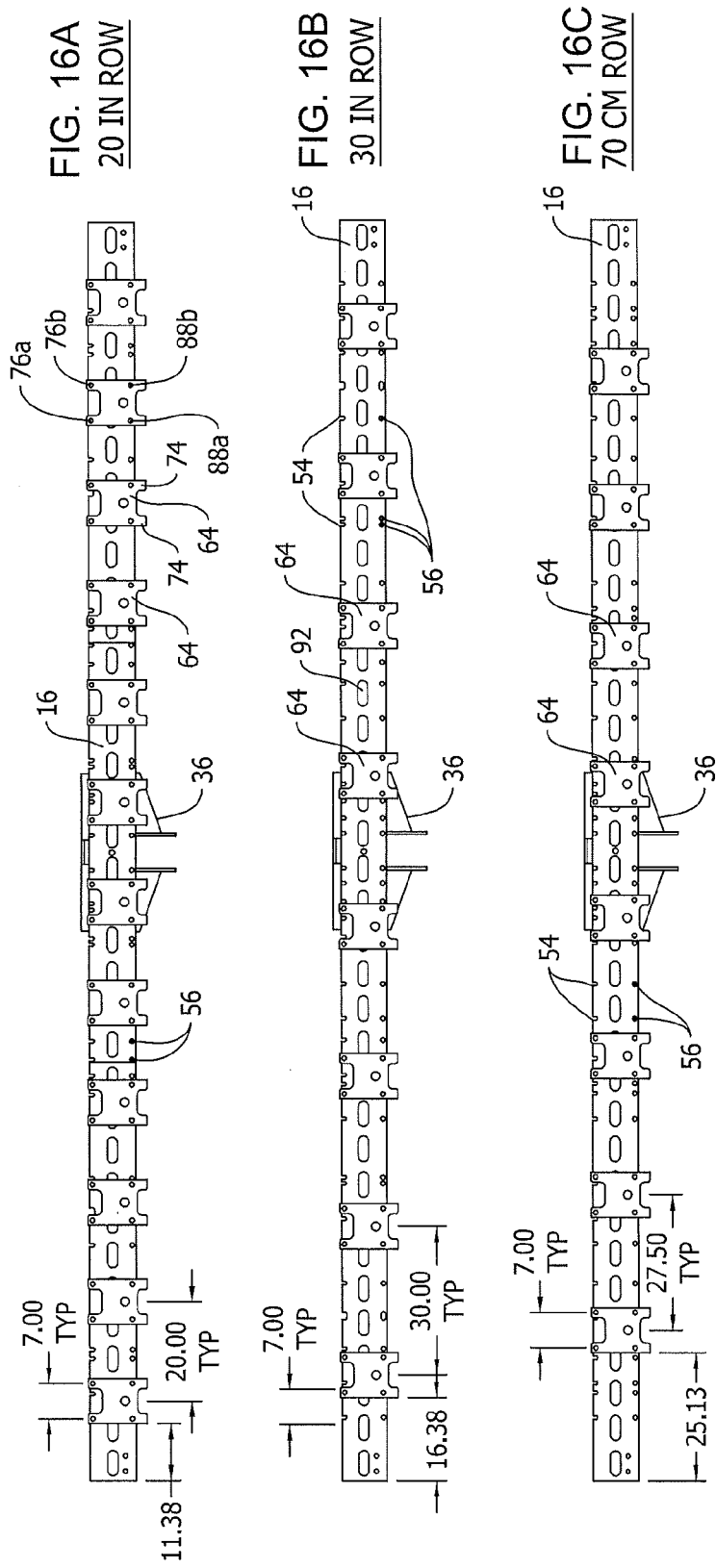

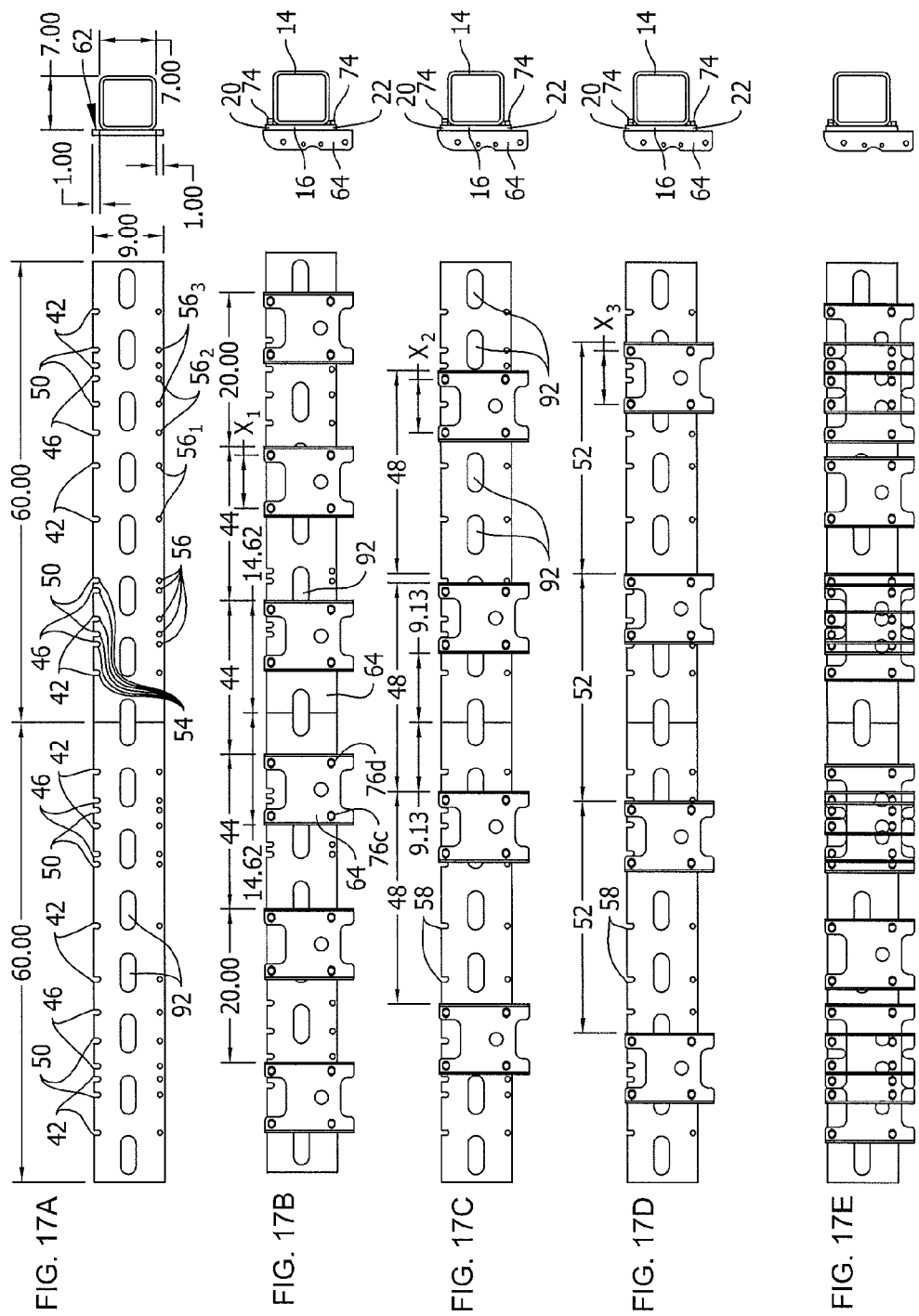

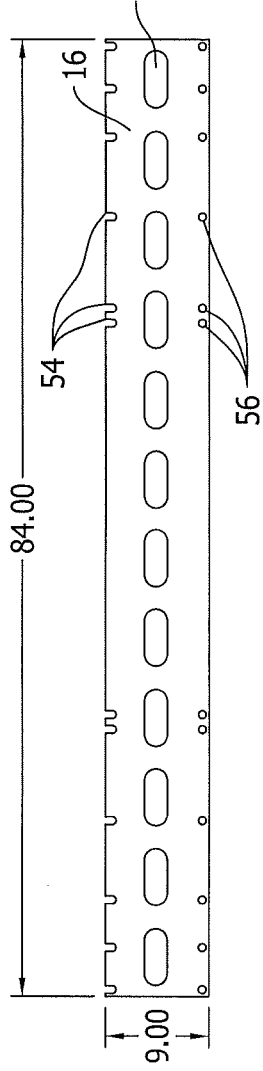
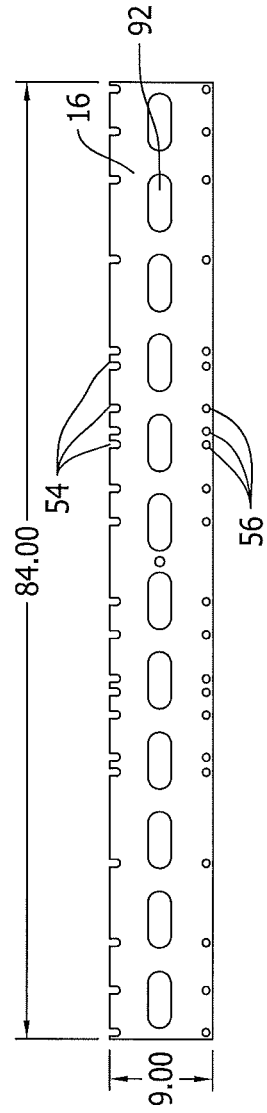
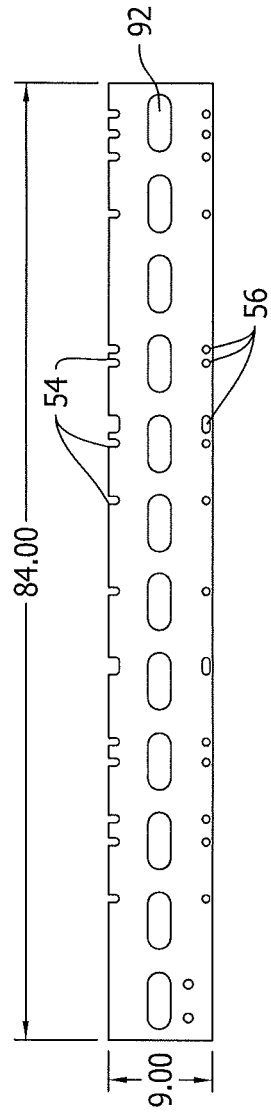

ADJUSTABLE PLANTER BAR SYSTEM

RELATED AND CO-PENDING APPLICATION

This application claims the benefit of U.S. Provisional Patent Application No. 61/946,453 filed on Feb. 28, 2014, which is expressly incorporated herein by reference in its entirety.

FIELD OF THE INVENTION

The present invention relates generally to the field of tools, and more particularly to a multi-function holder that is useful for carrying and storing tools.

BACKGROUND

Planters are known to be useful as equipment for sowing crops on a field and other agricultural applications. Planters are often needed for large-scale farming operations. Conventional planters have bins arranged in one or more rows for dispensing seeds or fertilizer as the planter is towed behind a tractor. The most common spacing for rows in the United States is 30 inches apart, and the planter units can provide precision sowing according to the type of seed to be sown and the rate at which the seeds are to be sown. While conventional planters may be useful in some instances, there are still numerous deficiencies and the potential for more useful planters and planter accessories for the modern farming industry.

SUMMARY

An adjustable planter bar system for a multi-row planter is described herein. The planter bar includes a horizontal support bar, a first plate member coupled to a trading side of the support bar, and a second plate member coupled to a leading side of the support bar. The first plate member can form an upper, trailing rail extending above the trailing side of the support bar.

These and other features, objects and advantages of the present invention will become more apparent to one skilled in the art from the following description and claims when read in light of the accompanying drawings.

BRIEF DESCRIPTION OF THE DRAWINGS

FIG. 2A is a top cross-sectional view of a planter bar-mounting plate attachment arrangement shown in FIG. 1.

FIG. 2B is a side view of the planter bar-mounting plate attachment arrangement of FIG. 2A.

FIG. 2C is a perspective view of the clip shown in FIG. 2A.

FIG. 2D is a partially transparent front view of the planter bar-mounting plate attachment arrangement of FIG. 2A.

FIG. 3A is a side view of a planter bar described herein, while FIG. 3B is a perspective view of the planter bar of FIG. 3A.

FIGS. 11A and 11B are top and side views of a planter bar flex point as described herein, while FIG. 11C shows a side view of the planter bar flex point in a flexed position.

FIGS. 16A to 16C are front views of planter bar and mounting plate arrangements for 20 inch, 30 inch, and 70 cm mounting plate spacing arrangements as described herein.

FIG. 17A is a front view of a planter bar designed with notches to allow for a variety of mounting plate spacing arrangements, FIGS. 17B, 17C, and 17D show front view of the planter bar of FIG. 17A with mounting plates at 44 unit spacings, 48 unit spacings, and 52 unit spacings, respectively, while FIG. 17E shows all of the mounting plate spacings superimposed together.

FIGS. 18A to 18C are front views of planter bar arrangements as described herein.

DETAILED DESCRIPTION

Figure 1:
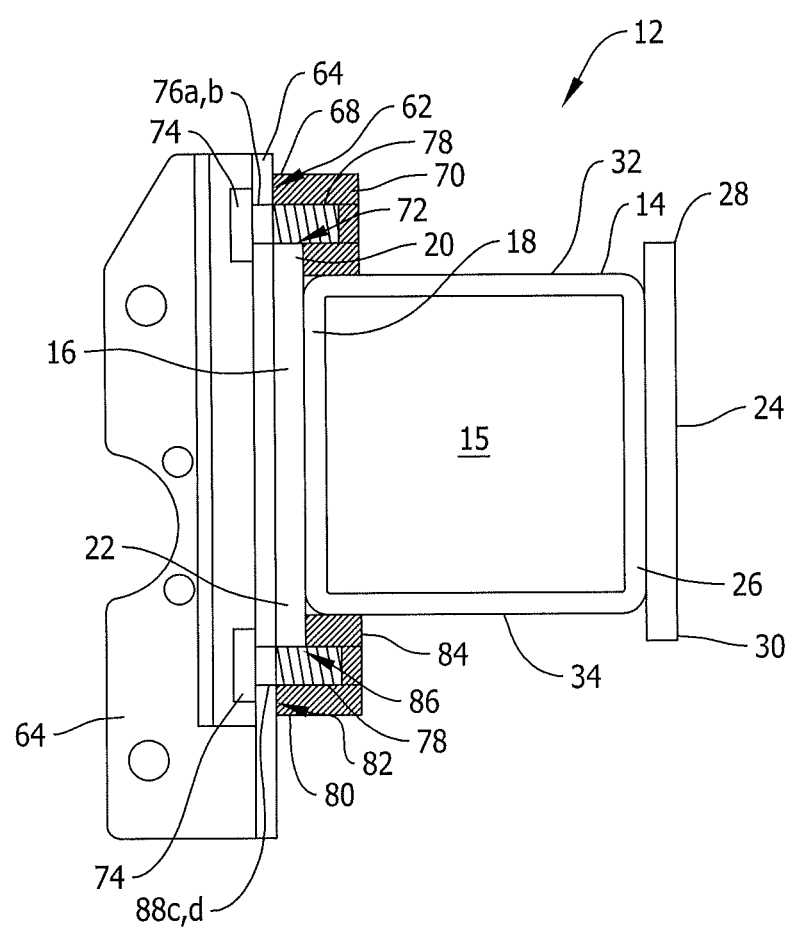
FIG. 1 is a side cross-sectional view of a mounting plate clipped to a planter bar as described herein.

A multi-row planter system including a planter bar and planter mounting system providing universally adjustable row and accessory spacing is described herein. As used herein, spatially relative terms, such as "horizontal," "upper," "lower," "leading," and "trailing," and the like, are used for ease of description to describe one element or feature's relationship to another element(s) or feature(s) as illustrated in the figures. The spatially relative terms are intended to encompass different orientations of the apparatus in use or operation in addition to the orientation depicted in the figures. The apparatus may be otherwise oriented (rotated 90 degrees or at other orientations) and the spatially relative descriptors used herein may likewise be interpreted accordingly. In particular, "leading" refers to the portion of the feature closest to a vehicle pulling the multi-row planter system, while "trailing" refers to the portion further after from the vehicle.

As shown in the Figures, the multi-row planter system 10 can include a planter bar 12. The planter bar 12 can include a horizontal support bar 14, a first plate member 16 coupled to the trailing side 18 of the support bar 14, and a second plate member 24 coupled to the leading side 26 of the support bar 14, wherein the leading side 26 is opposite the trailing side 18. In some embodiments, the first plate member 16 forms an upper, trailing rail 20 that extends above the trailing side 18 of the support bar 14, a lower, trailing rail 22 that extends below the trailing side 18 of the support bar 14, or both 20, 22. In some embodiments, the second plate member 24 forms an upper, leading rail 28 that extends above the leading side 26 of the support bar 14, a lower, leading rail 30 that extends below the leading side 26 of the support bar 14, or both 28, 30.

The first plate member 16 and the second plate member 24 can be welded to the support bar 14. This provides additional support for the support bar 14 and eliminates the need for trussing or additional reinforcement against bending. Thus, in some embodiments, there is no trussing or additional bending reinforcement within the support bar, external to the support bar, or both. In some embodiments, as shown in FIGS. 3B & 15-19, the first plate member 16 and second plate member 24 can include intermittent cutouts 92 between the upper rail 20, 28 and the lower ail 22, 30. The cutouts 92 can be any shape including elongated and/or oblong. In addition to making the planter bar 12 lighter, this technique also allows for additional welds 93 between the plate member 16, 24 and the support bar 14 along the perimeter of the cutout 92. These addition welds further strengthen the planter bar 12.

In some embodiments, the support bar 14 is an elongated bar with a uniform cross-section. In some embodiments, the support bar 14 can be a hollow bar. For example, as shown in FIGS. 1, 2B, 3A, 3B, 4, 9 & 10, the support bar 14 can have a hollow, generally square or rectangular cross-section. In such embodiments, the support bar 14 can have a trailing side 18, a leading side 26, a top side 32, and a bottom side 34. As evident from FIG. 1, generally square or rectangular is intended to encompass a square or rectangular cross-sections with rounded (fillet) or chamfered corners, as well as, a squares and rectangles for 90° corners.

In some embodiments, each side 18, 26, 32, 34 of the support bar 14 can be 6" long, while each side 18, 26, 32, 34 of the support bar 17 can be 7" long in other embodiments. In some embodiments, the sides 18, 26, 32, 34 of the planter bar 12 can be a thickness selected from the group consisting of ¼", ⅜", ½" ⅝" and ¾" or any other useful thickness.

Figure 13:
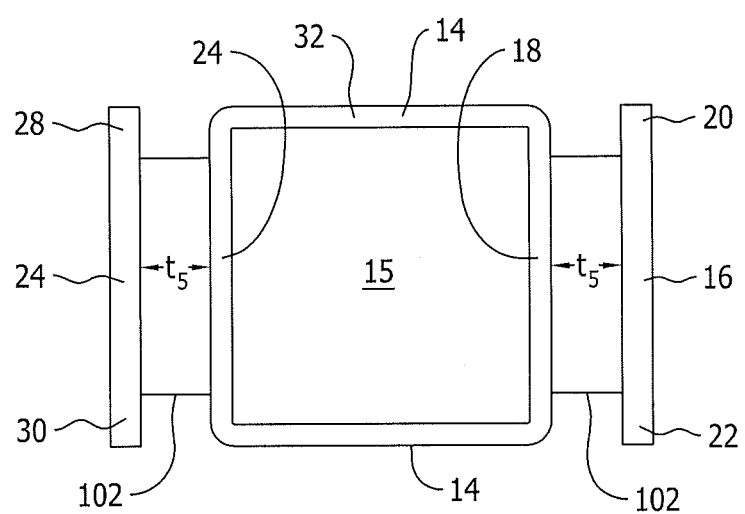
FIG. 13 is a side view of a planter bar as described herein.

In some embodiments, the first plate member 16, the second plate member 24, or both 16, 24, can be 7" tall and ½ thick. In some embodiments, it may be desirable to retrofit an existing system that used tubing that is the same height as the distance between upper and lower openings 76a,b and 88c,d in a mounting plate 64. In such embodiments, as shown in FIG. 13, a spacer 102 can be attached to the leading side 24, a spacer 102 can be attached to the trailing side 18, or both. Depending on if rails are desired on just the trailing side 18, just the leading side 24, or both 18, 24, first and or second plate members 16, 24 can be attached to the spacer(s) 102. In such embodiments, the rails 20, 22, 28, 30 are defined by the portion of the respective plate members 16, 24 that extend above or below the spacer 102.

The thickness ($t_s$) of the spacer 102 should be selected so that it is possible to access the threaded fasteners 74 when tightening or loosening clips 70, 84 to move or secure the mounting plates 64. In some embodiments, the thickness ($t_s$) can be at least 1", or at least 1.25", or at least 1.5", or at least 1.75", or at least 2". In some embodiments, the thickness ($t_s$) can be 4" or less, or 3" or less, or 2.5" or less, or 2" or less.

Regardless of the dimensions of the support bar 14, the spacer 102, and the plate members 16, 24, in some embodiments, the first plate member 16, the second plate member 24, or both 16, 24 can be attached to the support bar 14 such that the rails 20, 22, 28, 30 project out at least ¼", at least ½", at least ¾", or at least 1" from the adjacent structure to which they are most proximately permanently joined (e.g., the support tube 14 or the spacer 102). Regardless of the dimensions of the support bar and the plate members 16, 24, in some embodiments, the first plate member 16, the second plate member 24, or both 16, 24 can be attached to the support bar 14 such that the rails 20, 22, 28, 30 project out no more than 3", no more than 2", no more than 1", no more than ¾", or no more than ⅝" from the adjacent structure to which they are most proximately permanently joined (e.g., the support tube 14 or the spacer 102).

In some embodiments, where only one plate member 16 is used, the width of the support bar 14, the thickness of the spacer 102, and the thickness of the plate member 16 can be selected so that the overall width of the planter bar 12 is a desired value. For example, in some embodiments, the width of the support bar 14 can be 5", the thickness of the spacer can be 1.5", and the thickness of the plate member 16 can be 0.5", so that the total width is 7". At the same time, the height of the support bar and the plate member can be 7". This allows users all of the benefits described herein—including a clear rail, while retrofitting existing systems and maintaining the option of using existing U-bolt attachment techniques.

Figure 10:
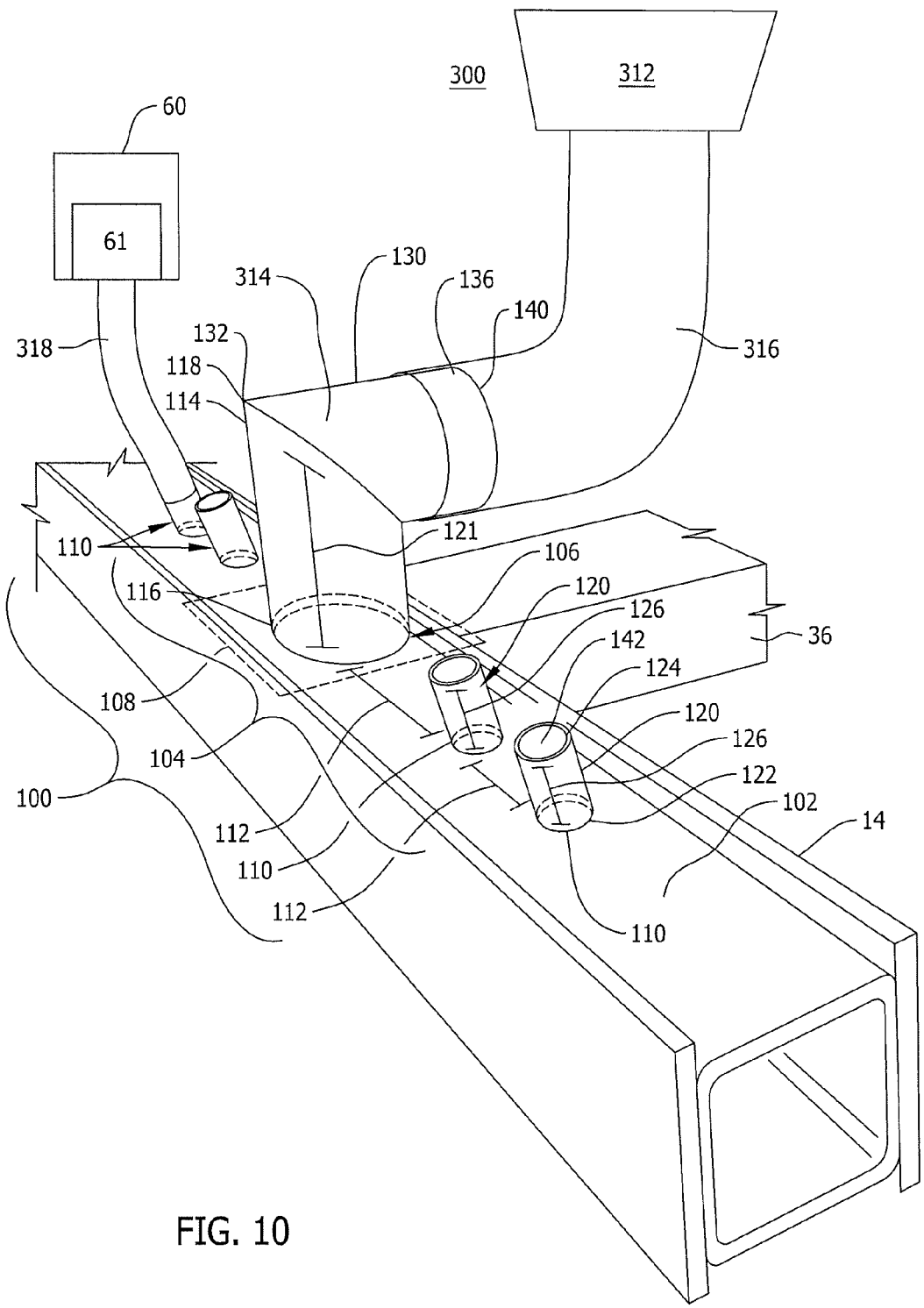
FIG. 10 is a perspective view of a portion of a planter bar that incorporates an air handling system for distributing air and/or solids to moveable units (e.g., planter units) attached to the planter bar.
Figure 19A:
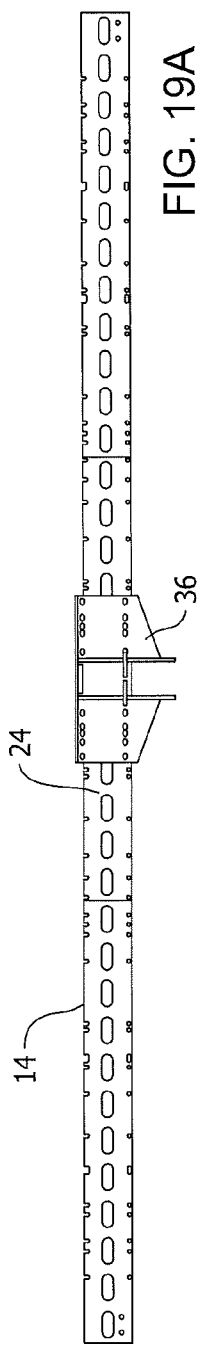
FIGS. 19A, 19B, 19C, and 19D are front, top, rear, and side views, respectively, of a planter bar, including a vehicle mount as described herein.
Figure 19B:
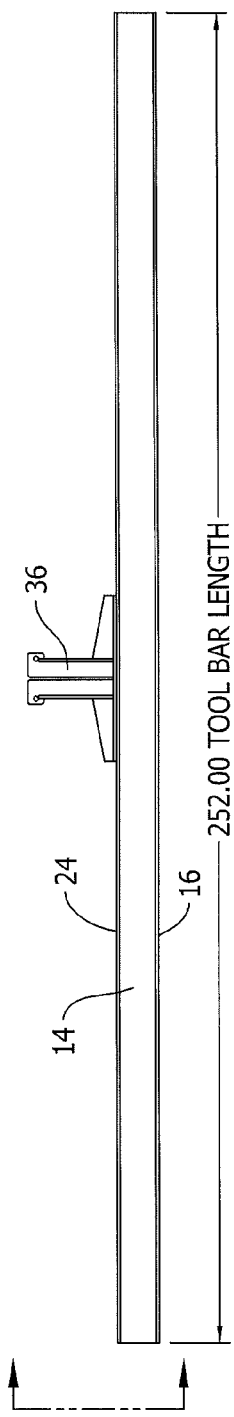
Figure 19C:
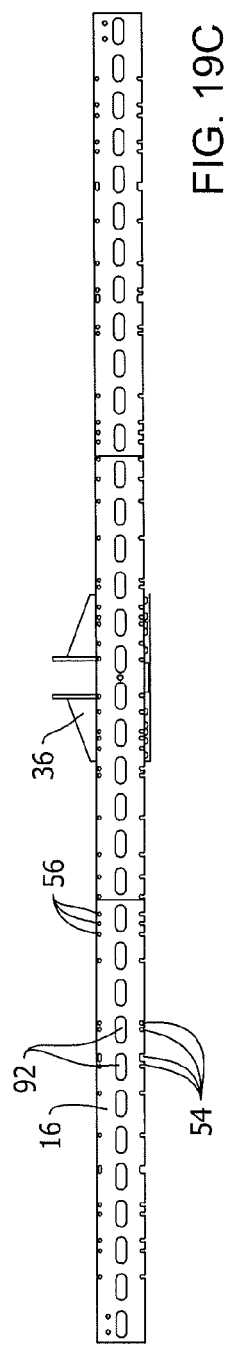
Figure 19D:
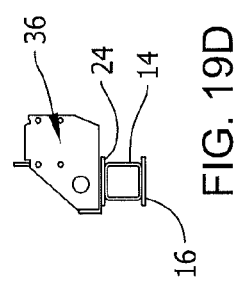

In some embodiments, the multi-row planter system 10 is adapted for coupling to a vehicle positioned proximate the leading side 26. For example, as shown in FIGS. 10, 16 & 19, the multi-row planter system 10 can include a vehicle mount 36. In some embodiments, the vehicle mount 36 can be attached to the upper, leading rail 28, the lower, leading rail 30, or both 28, 30 using the same securing techniques and fasteners described herein for attachment of the planting units 38 to the planter bar 12. In other embodiments, the vehicle mount 36 can be welded to the planter bar 12. In still other embodiments, as shown in FIG. 19A, the planter bar 12 can be attached to the vehicle mount 36 by a combination of bolts.

In some embodiments, the multi-row planter system 10 includes at least one planting unit 60 coupled to the planter bar 12 by a mounting plate 64. The mounting plate 64 can be coupled to an inside surface 62 of the upper, trailing rail 20 and the lower trading rail 22. In some embodiments, at least one planting unit 60 includes a mounting plate 64 adjacent an outside surface 66 of the first plate member 16 and at least one upper fastener 68 extending from the outside surface 66 of the first plate member 16 and contacting the inside surface 62. In some embodiments, the at least one upper fastener 68 is adjustably coupled to the mounting plate 64.

In some embodiments, such as those shown in FIGS. 1, 2, 4 & 9, the upper fastener 68 can include an upper clip 70 that extends over an upper edge 72 of the upper, trailing rail 20 and contacts the inside surface 62 of the upper, trailing rail 20. In some embodiments, the upper clip 70 is coupled to the mounting plate 64 by at least one threaded faster 74 (e.g., a screw or a bolt). In some embodiments, the upper clip 70 can be adapted to receive the threaded fasteners 74 via at least one clip orifice 78. In some embodiments, the at least one clip orifice 78 can be threaded, while the clip orifice 78 is not threaded in other embodiments. In embodiments were the clip orifice 78 is not threaded, the threaded fastener 74 can be secured with a nut 90.

In some embodiments, the upper clip 70 is coupled to the mounting plate 64 by at least two threaded fasteners 74a, 74b. In some embodiments, the mounting plate 64 can include at least two upper mounting plate orifices 76a, 76b that are spaced apart by the same distance as the corresponding clip orifices 78a, 78b.

FIGS. 5-9 show a variation of the multi-row planter system 10 described herein. In some embodiments, the upper clip 70 includes a base portion 202 having a top surface 204 and a bottom surface 206, where a plurality of apertures 208 extend from the top surface 204 to the bottom surface 206. The base portion 202 of the upper clip 70 can include any number of apertures 208 that enables the upper clip 70 to function as described herein. For example, the base portion 202 can include three apertures 208 such that adjacent apertures 208 are spaced an equal distance 210 from each other.

In some embodiments, such as that shown in FIGS. 5-9, the base portion 202 of the upper clip 70 also includes two anchor projections 212 that are spaced a distance 214 from each other and extend from an abutment edge 203. The anchor projections 212 stabilize the base portion 202 when it is coupled to the mounting plate 64. For example, the mounting plate 64 can have an interior surface 216 and an exterior surface 218, wherein two anchor openings 220 extend from the interior surface 216 to the exterior surface 218. Each anchor opening 220 is positioned and sized to receive the corresponding anchor projection 212 therein when a threaded fastener 74 passes through each clip orifice 78 and mounting plate orifice 76a, 76b pair.

In some embodiments, as shown in FIGS. 5-9, the upper clip 70 includes a clipping portion 230 that is coupled to the base portion 202. For example, the clipping portion 230 can include a first end 232 and a second end 234 that is a distance 236 from first end 232 such that clipping portion 230 extends outwardly from the base portion 202. In some embodiments, the first end 232 includes a plurality of tabs 240 such that each tab 240 is coupled to the corresponding aperture 208 of the base portion 202. For example, each aperture 208 in the base portion 202 can be sized and configured to receive the corresponding tab 240 therein. In some embodiments, each tab 240 is retained in the corresponding aperture 208 for example using a welding process. As such, the base portion 202 and the clipping portion 230 can be formed of the same suitable material.

In some embodiments, the base portion 202 and the dipping portion 230 are formed of a single material and the tab-aperture (240-208) arrangement is not present. In such embodiments, the dip 70 can be formed using a variety of processes that include, but are not limited to, molding, casting, drawing, extruding, machining, and combinations thereof.

The dipping portion 230 of the upper clip 70 includes an interior surface 246 and exterior surface 248, and two dip orifices 78a, 78b that extend from interior surface 246 to the exterior surface 248. The dip orifices 78a, 78b are located between the first end 232 and the second end 234 of the dipping portion 230. The dip orifices 78a, 78b can be positioned on the dipping portion 230 a distance 252 from each other so that they align with the mounting plate orifices 76a, 76b when the anchor projections 212 are in the anchor openings 220. The mounting plate orifices 76a, 76b are spaced on the mounting plate 64 such that when the anchor projections 212 are inserted into the anchor openings 220 of the mounting plate 64, each clip or ice 78a, 78b is aligned with the corresponding mounting plate orifice 76a, 76b of the mounting plate 64.

Figure 9:
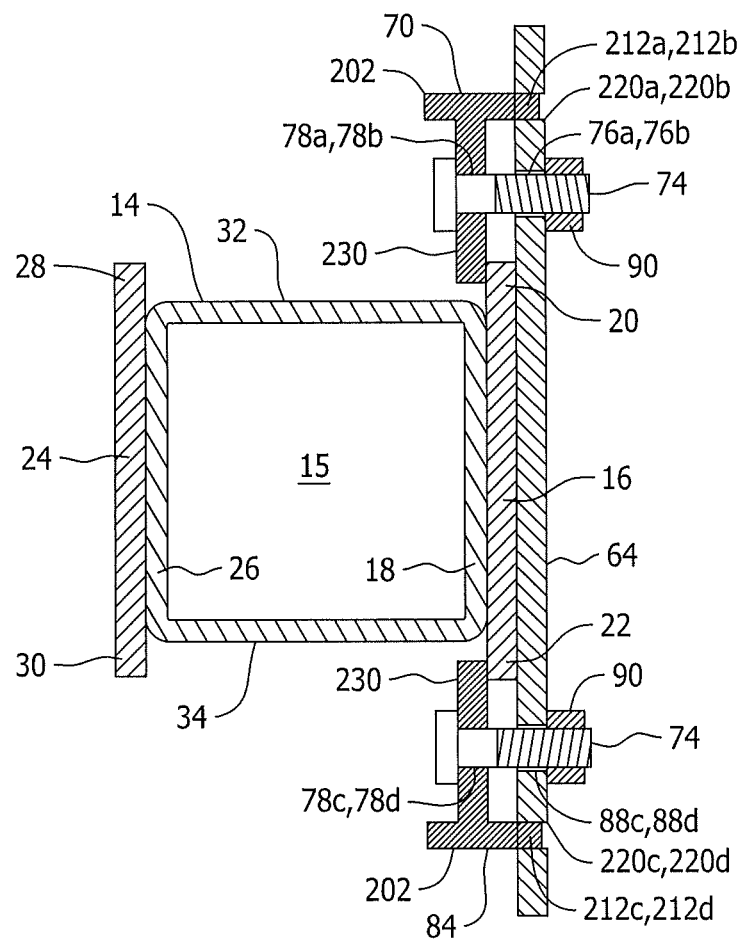
FIG. 9 is a side cross-sectional view of a mounting plate clipped to a planter bar, using the clips and mounting plates according to FIG. 5, as described herein.

In some embodiments, the clip orifices 78a, 78b of the clipping portion 230 have diameters that are equal to the diameters of the mounting plate orifices 76a, 76b of the mounting plate 64. As shown in FIG. 9, a fastener, such as a threaded fastener 74, can be positioned inside each of the orifices 76, 78 to securely couple the clip 70 to the mounting plate 64. In some embodiments, as shown in FIG. 9, a nut 90 can be used with the threaded fastener 74 to ensure secure coupling. In other embodiments, similar to those shown in FIG. 1, the clip orifice 78a, 78b or the mounting plate orifice 76a, 76b can be threaded and adapted to receive the threaded fastener 74.

As will be understood, in some embodiments, the lower clip 84 can be identical to the upper clip 70. Such embodiments are shown in FIGS. 1, 2B, 4, and 9. In embodiments that include anchor projections 212, such as the one shown in FIG. 9, everything will be identical except that the anchor openings 220 will be below the lower mounting plate orifices 88. In other words, as shown in FIG. 9, the upper and lower mounting plate orifices 76a, 76b, 88c, 88d will be between the upper and lower anchor openings 220a, 220b, 220c, 220d.

Figure 5:
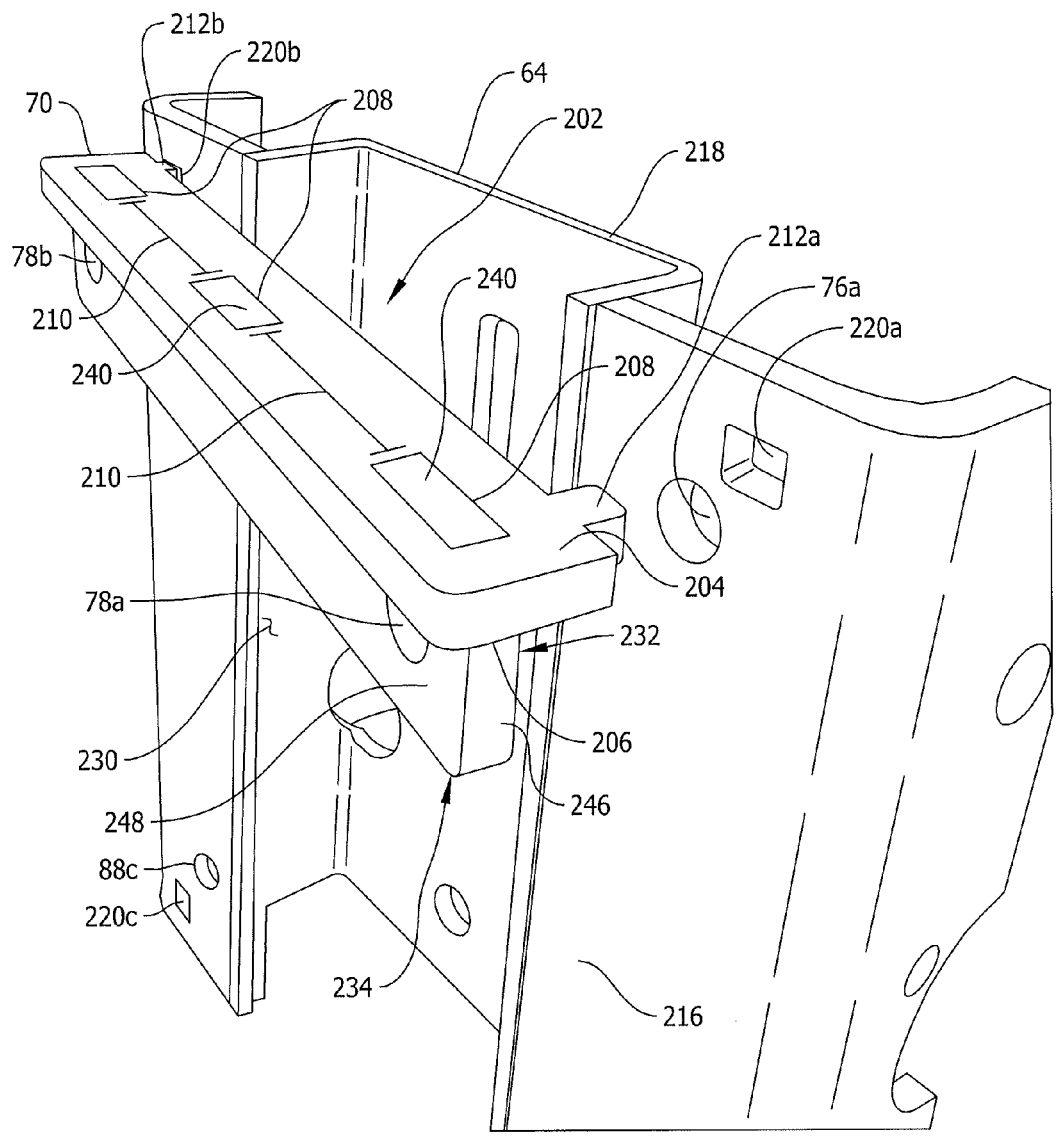
FIG. 5 is a perspective view of a clip and mounting plate as described herein.
Figure 6:
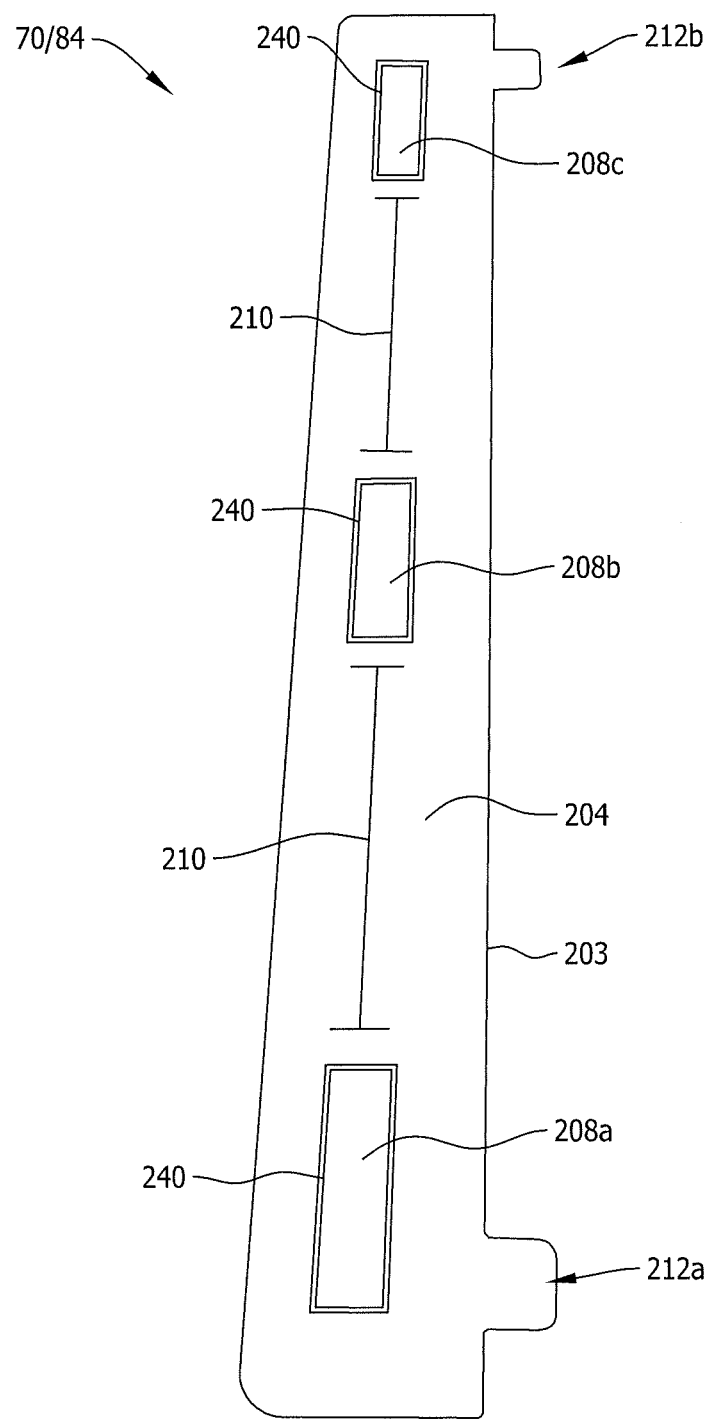
FIG. 6 is a top, perspective view of the clip shown in FIG. 5.
Figure 7:
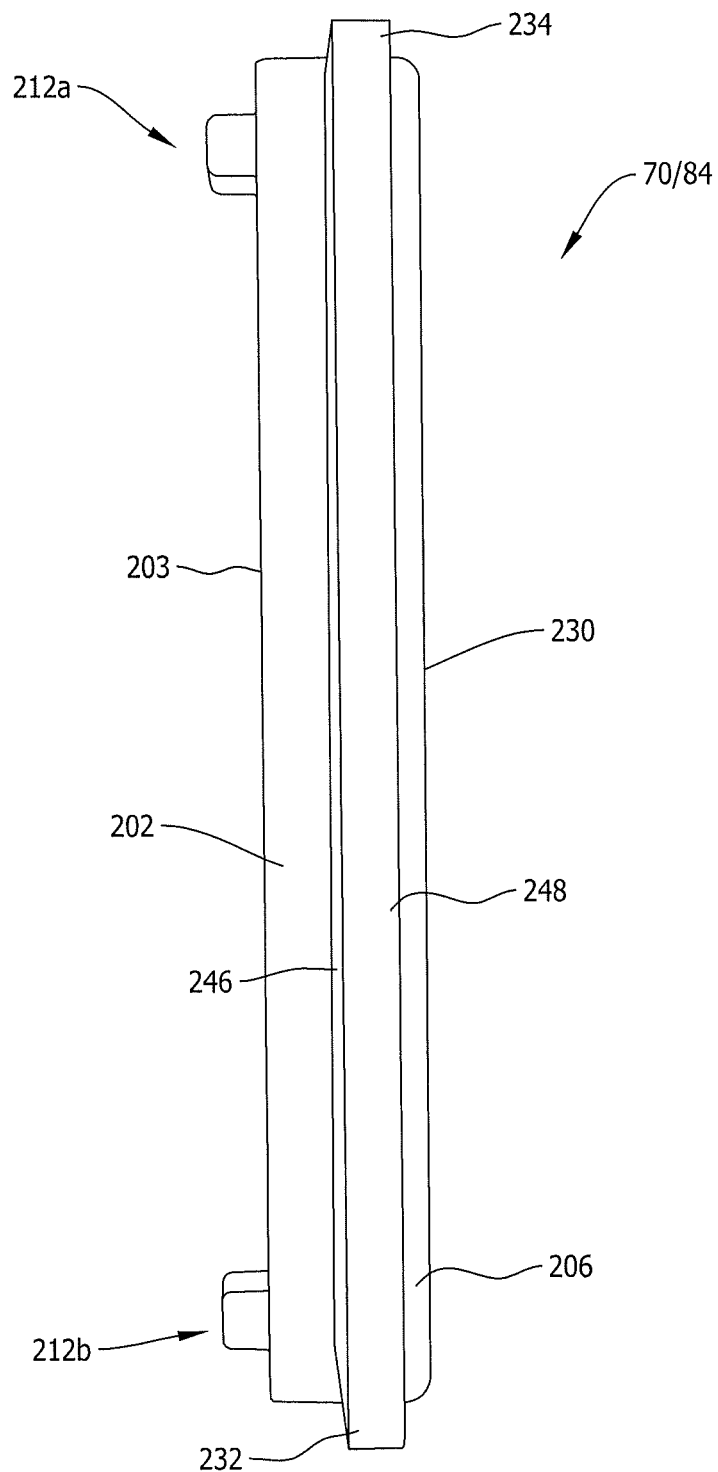
FIG. 7 is a bottom, perspective view of the clip shown in FIG. 5.
Figure 8:
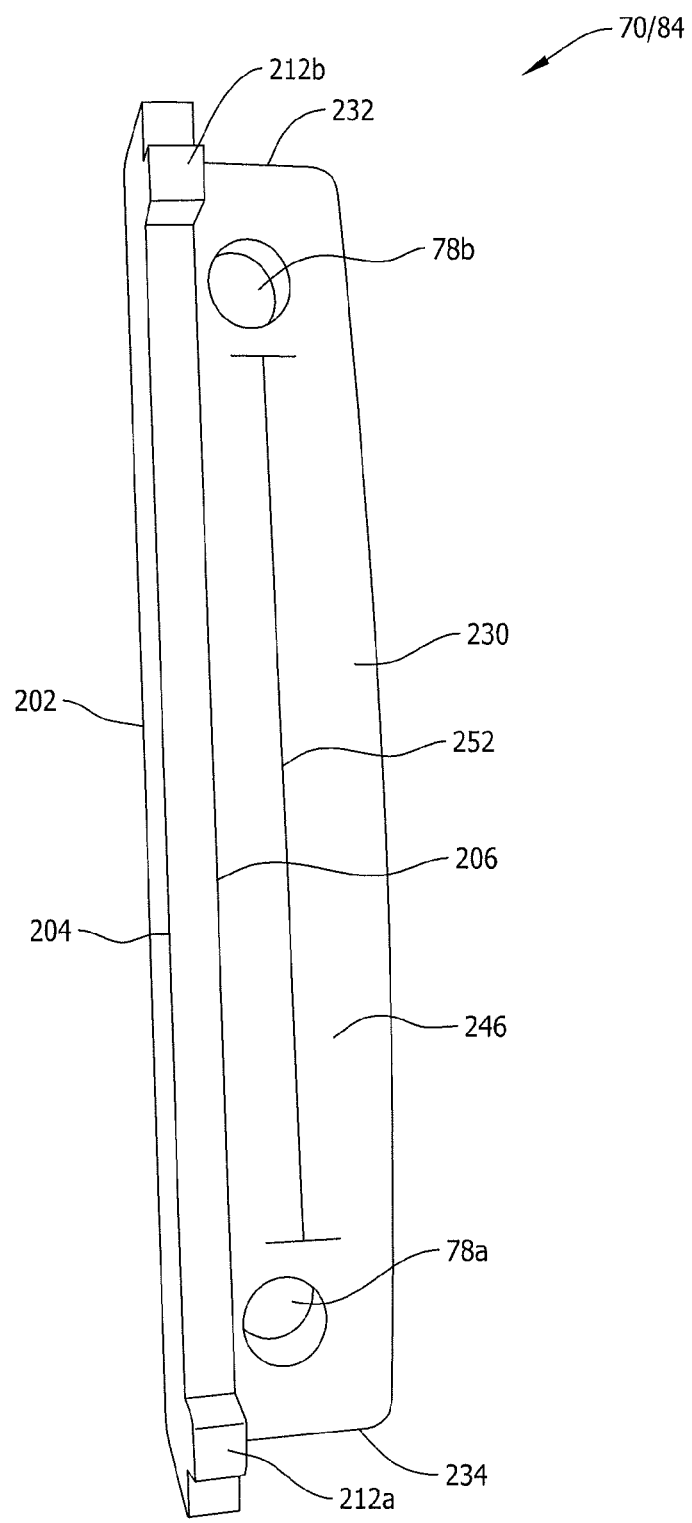
FIG. 8 is a front, perspective view of the clip shown in FIG. 5

In some embodiments, as shown in FIG. 6, the middle aperture 208b is loved closer to the abutment edge 203 than the end apertures 208a, 208c. In such embodiments, as shown in FIG. 5, one clip orifice 78a can be positioned proximate to or overlapping with (immediately below) a first edge aperture 208a and a second clip orifice 78b can be positioned proximate to or overlapping with a second edge aperture 208c. Because the middle of the clipping portion 230 starts closer to the rail 20, 22, 28, 30 to which it is being secured, such an arrangement enhances the clipping action when the threaded fasteners 74 passing through the dip orifices 78 and mounting plate orifices 76, 88 are tightened. In some embodiments, this arrangement can introduce a slight bow to the dipping portion 230 when the dipping portion is in a resting position, which results in more even pressure of the clipping portion 230 against the rail 20, 22, 28, 30 when the threaded fasteners 74 are tightened. In the absence of such an arrangement, the middle portion of the clipping portion 230 can bend away from the mounting plate 64 as the threaded fasteners 74 passing through the clip orifices 76, 88 are tightened.

Figure 4:
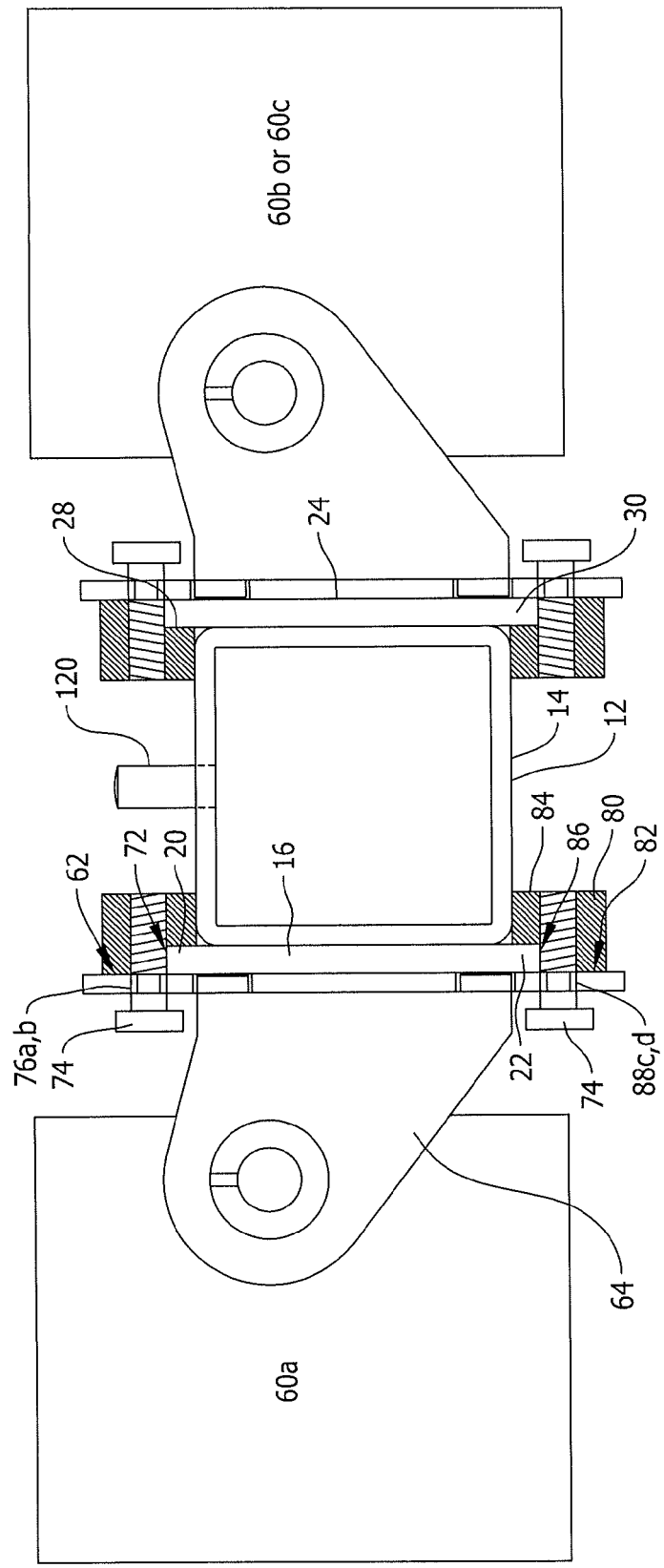
FIG. 4 is a side cross-sectional view of a mounting plate clipped to a planter bar as described herein.

Referring to FIG. 4, in some embodiments, the multi-row planter system 10 also includes at least one lower fastener 80 extending from the outside surface 66 and contacting an inside surface 82 of the lower, trailing rail 22. In some embodiments, the at least one lower fastener 80 is adjustably coupled to the mounting plate 64. While shown specifically in the embodiment of FIG. 4, it will be understood that any mounting plate-clip (64, 70, 84) system that attaches to a leading rail system 20, 22 can also attach to a trailing rail 28, 30 using the same.

The lower fastener 80 can include a lower clip 84 that extends over a lower edge 86 of the lower, trailing rail 22 and contacts the inside surface 82 of the lower, trailing rail 22. In some embodiments, the lower clip 84 is coupled to the mounting plate 64 by at least one threaded faster 74 (e.g., a screw or a bolt). In some embodiments, the lower clip 84 can be adapted to receive the threaded fasteners 74 via at least one clip orifice 78. In some embodiments, the at least one clip orifice 78 can be threaded, while the clip orifice 78 is not threaded in other embodiments. In embodiments where the clip orifice 78 is not threaded, the threaded fastener 74 can be secured with a nut 90.

Figure 12:
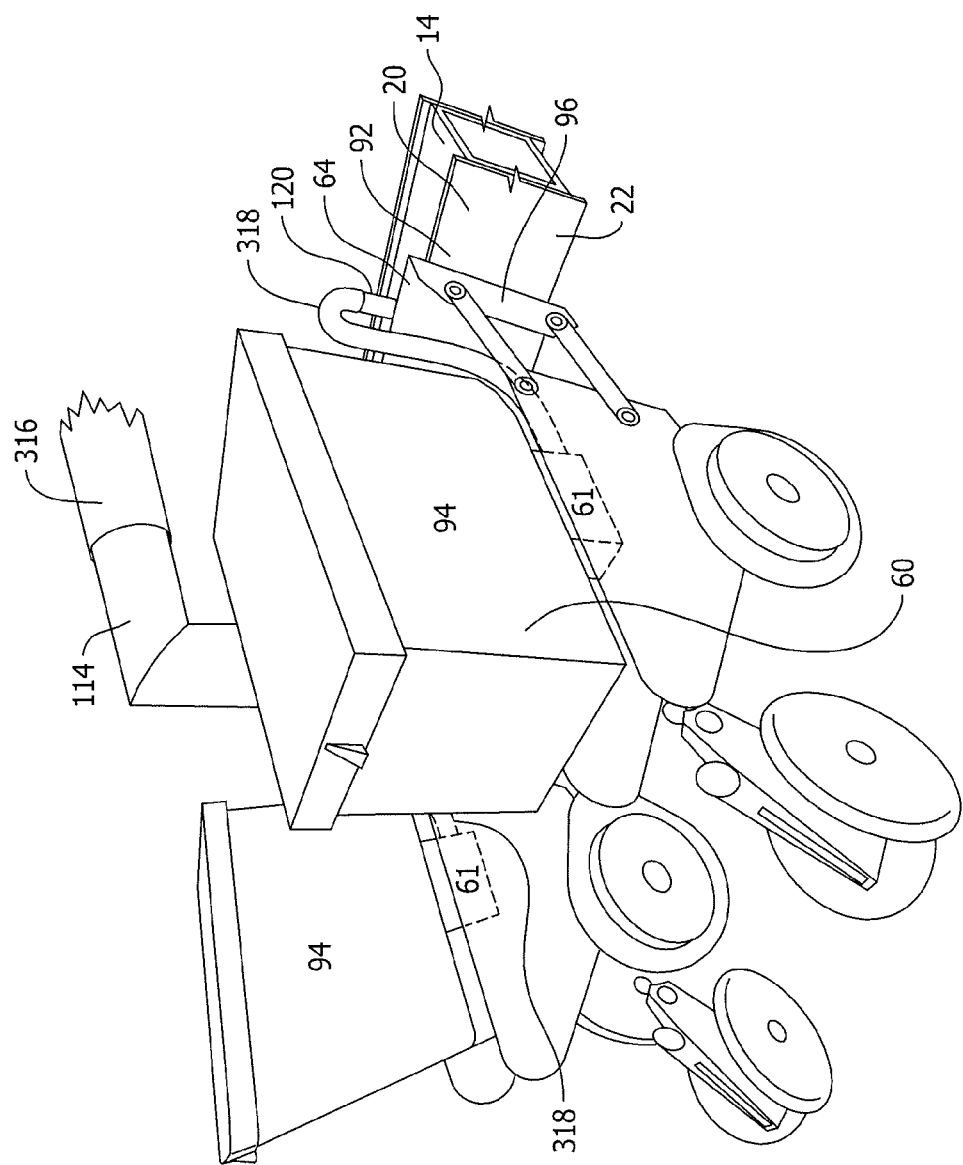
FIG. 12 is a perspective view showing planters coupled to a portion of a planter bar of the planter bar system described herein.

In some embodiments, as shown in FIGS. 10 & 12, the multi-row planter system 10 includes a vacuum system 300. The vacuum system 300 can include a vacuum pump 312 for pulling a vacuum, a master vacuum duct 314, and secondary vacuum ducts 120 for supplying a vacuum to a plurality of metering units 61 integrated into moveable farming units 60 (e.g., fertilizer units, planter units, etc.) attached to the planter bar 12. In some embodiments, the vacuum system 314 can be integrated into the support bar 14. For example, in some embodiments, vacuum is applied by the pump 312 causing air to enter inlets 142 in the secondary vacuum ducts 120 and enter into the distribution conduit 15 inside the support bar 14 and then exit through the master vacuum duct 314 before passing through the vacuum pump 312. In some embodiments, the moveable farming units 60 can include a vacuum-operated metering unit 61 for metering a solid (e.g., seeds or solid fertilizer) stored in a hopper 94. In such embodiments, as shown in FIG. 12, the vacuum-operated metering unit 61 can be connected to the vacuum system 300 via a secondary vacuum conduit 318 that is connected to a secondary vacuum duct 120.

As shown in FIG. 10, although the multi-row planter system 10 includes a vacuum system 300, this does not create any obstructions for the dips 60, 70 used to secure the mounting plates 64 to the planter bar 12. This results in a clear rail, which allows the mounting plate 64 to slide along the rails 20/22 or 28/30 from adjacent to the master opening 106 to the end of the planter bar 12 without needing to completely remove either clip 60, 70 from the mounting plate 64. In some embodiments, a majority (>50%) of the length of the first plate member 16, the second plate member 24, or both, on each side of a mid-point of the planter bar 12 comprises a continuous clear rail. In some embodiments, at least 70%, or at least 75%, or at least 80%, or at least 85% of the length of the first plate member 16, the second plate member 24, or both, on each side of a mid-point of the planter bar 12 comprises a continuous clear rail. As used herein, "continuous clear rail" refers to a continuous segment of clear rail and not the total of multiple separate portions of clear rail.

Unlike existing systems, this makes the spacing of moveable farming units 60 mounted on the planter bar 12 described herein universally adjustable to conform with the desired row spacing for any crop. In contrast, existing multi-row planter systems are designed for a single spacing, which cannot be changed because of both obstructions and the existing u-bolt technique used to fasten the mounting plate to the feeder bar.

In some embodiments, as shown in FIG. 10, the support bar 14 can include a plurality of cylindrical vacuum members 100 that enable vacuum to be channeled through the support bar 14 for use by the multi-row planter system 10. Referring to FIG. 10, for example, a surface 102 of the support bar 14 can include a plurality of circular openings 104 that each extend from the surface 102 to a distribution conduit 15 within the support bar 14. In some embodiments, the apertures 104 can include a master opening 106 that is positioned on a center portion 108 of the top side 32 of the support bar 14. The circular openings 104 can also include a plurality of secondary openings 110 that each have a diameter that is less than the diameter of the master opening 106. In some embodiments, the secondary openings 110 can have diameters that are equal to one another or that vary, so long as the diameters of the secondary openings 110 are each less than the diameter of the master opening 106. The diameters for each of the master openings 106 and the secondary openings 110 can be any suitable diameter that enables the multi-row planter system 10 to function as described herein.

In some embodiments, the secondary openings 110 are positioned such that an equal number of secondary openings 110 are located to each side of the master opening 106. For example, in some embodiments the support bar 14 can include at least ten secondary openings 110 or at least 16 secondary openings 110 such that half of the secondary openings 110 are positioned on each side of the master opening 106. In some embodiments, the secondary openings 110 on each side of the master opening are spaced such that adjacent apertures are an equal distance 112 from one another. In some embodiments, the distance 112 between the secondary openings 110 varies.

In some embodiments, the vacuum members 100 can include a master vacuum member 114 having a first end 116 that is positioned over the master opening 106 and a second end 118 that is a distance 121 from the first end 116 such that the master vacuum member 114 extends away from the top face 32, wherein the diameter of the master vacuum member 114 is approximately equal to the diameter of the master opening 106. The vacuum members 100 can also include a plurality of secondary vacuum members 120 that each have a first end 122 that is positioned over the secondary openings 110 such that each secondary vacuum member 116 is positioned over a different secondary opening 110. The secondary vacuum members 120 also each have a second end 124 that is a distance 126 from the first end 122 such that the secondary vacuum members 120 each extends away from the top face 32. In some embodiments, the distance 121 is different than distance 126. For example, distance 121 can be greater than distance 126. In some embodiments, distance 121 can be equal to distance 126.

In some embodiments, each secondary vacuum member 120 has a diameter that is approximately equal to the diameter of the corresponding secondary opening 110. The diameters for each of the master vacuum member 114 and the secondary vacuum members 120 can be any suitable diameter that enables the multi-row planter system 10 to function as described herein. In some embodiments, the master vacuum member 114 and each of the secondary vacuum members 120 are integrally formed onto the surface 102 using a variety of processes known in the art, such as, but not limited to, a molding process, a welding process, a drawing process, or a machining process. As such, the master vacuum member 114 and each of the secondary vacuum members 120 can be formed of the same suitable materials as the top side 32 of the support bar 14. In some embodiments, the master vacuum member 114 is in fluid communication with the secondary vacuum member 120 via a distribution conduit 15 within the support bar 14. In some embodiments, at least a portion of the distribution conduit 15 is the interior surfaces of the support bar 14 itself.

In some embodiments, an attachment member 130 is integrally formed to the master vacuum member 114. For example, the attachment member 130 can include a first end 132 that is integrally formed with the second end 118 of the master vacuum member 114 such that the attachment member 130 and the master vacuum member 114 are a unitary component. The second end 118 of the master vacuum member 114 can be integrally formed with the first end 132 of the attachment member 130 by using a variety of processes known in the art, such as, but not limited to, a molding process, a welding process, a drawing process, or a machining process. As such, the master vacuum member 114 and the attachment member 130 can be formed of the same suitable materials.

In some embodiments, a second end 136 of the attachment member 130 includes an opening 140 that is in fluid communication with a channel that extends through the master vacuum member 114 and is in fluid communication with the corresponding central aperture 106 on the top side 32. Similarly, the second end 124 of each of the secondary vacuum members 120 includes an opening 142 that is in fluid communication with a channel that extends through the each secondary vacuum member 120 and is in fluid communication with the corresponding side aperture 110 on the top side 32. The opening 140 of the attachment member 130 is configured to receive and couple to a master conduit 316 such that seeds or fertilizer used by moveable farming units 60 can be channeled through the master vacuum member 114 and distributed to the secondary vacuum members 120, each of which is configured to receive and couple to a secondary vacuum conduit 318 that transports the seeds or fertilizer to the individual moveable farming units 60. It should be understood that any of the planter bars 12 described herein can include the vacuum system 300 described herein. This includes the pivoting arrangement of FIG. 11, which includes an intermediate conduit between adjacent planter bar portions 14a, 14b.

In some embodiments, such as those shown in FIG. 17A-17E, the upper, trailing rail 20 comprises a plurality of first engagement pairs 42 spaced apart by a first distance 44 laterally along the upper, trailing rail 20, and a plurality of second engagement pairs 46 spaced apart by a second distance 48 laterally along the upper, trailing rail 20, wherein the first distance 44 and the second distance 48 are different. In some embodiments, the first and second distances 44, 48 are independently selected from the group consisting of 20", 22", 27.5", 30", and 36".

In some embodiments, the upper, trailing rail 20 can also include a plurality of third engagement pairs 50 spaced apart by a third distance 52 different from the first and second distances 44, 48. In some embodiments, the third distance 52 is selected from the group consisting of 20", 22", 27.5", 30", and 36".

Each set of engagement pairs 42, 46, 50 can include two engagement members 42a, 42b, 46a, 46b, 50a, 50b. In some embodiments, each set of engagement pairs can be separated by a separation distance $X_1$, $X_2$, $X_3$, respectively. In some embodiments, the separation distances $X_1$, $X_2$, $X_3$ can be the same (e.g., 6", 7", 8", etc). This allows the user to use the same mounting plates 64 to any of the engagement pairs 42, 46, 50.

In some embodiments, any or all of the engagement pairs 42, 46, 50 can include apertures 54 for receiving a fastener (e.g., 68, 80). In some embodiments, the apertures 54 can be an orifice, while the apertures 54 can be notches 58 in the upper, trailing rail 20 in other embodiments, such as those shown in FIGS. 14 & 16-19.

As shown in FIGS. 16-19, in some embodiments, the lower, trailing rail 18 includes lower apertures 56 disposed vertically below the corresponding upper apertures 54 of the applicable engagement pairs 42, 46 and/or 50. The apertures 56 can be orifices or notches.

In some embodiments, the apertures 54 and/or 56 of the first engagement pairs 42 and the second engagement pairs 46 are visually distinguishable. In some embodiments, the first engagement pairs 42, second engagement pairs 46, and, where applicable, third engagement pairs 50, or their respective lower apertures 56 can be different shapes. For example, in some embodiments, the first engagement pairs 42 or the respective lower apertures $56_1$ can be diamond shaped, the second engagement pairs 46 or the respective lower apertures $56_2$ can be square, and the third engagement pairs 50 or their respective lower apertures $56_3$ can be round. As will be understood, other geometric shapes are possible, such as triangles, pentagons, hexagons, etc. Similarly, the engagement pairs 42, 46, 50 can be distinguished visually by other means, such as color or labeling (e.g., $1^{st}$, $2^{nd}$, $3^{rd}$ OR 20", 70 cm, 30 in.).

In some embodiments, the apertures 54 and lower apertures 56 in the first plate member 16 can correspond with identically placed apertures 54 and lower apertures 56 in the second plate member 24.

In some embodiments, the mounting plate 64 can include at least two upper mounting plate orifices 76a, 76b that are spaced apart by separation distance $X_1$, $X_2$, $X_3$ as the engagement members 42a, 42b, 46a, 46b, 50a, 50b. In such embodiments, the upper clip 70 will have a longitudinal length greater than the separation distance $X_1$, $X_2$, $X_3$. This allows the threaded fasteners 74a, 74b to pass through the upper mounting plate orifices 76a, 76b, the upper apertures 54, and be secured in the clip orifices 78a, 78b.

In some embodiments, the lower clip 84 is coupled to the mounting plate 64 by at least two threaded fasteners 74a, 74b. In some embodiments, the mounting plate 64 can include at least two lower mounting plate orifices 88a, 88b that are spaced apart by the same separation distance $X_1$, $X_2$, $X_3$ as the engagement members 42a, 42b, 46a, 46b, 50a, 50b. In such embodiments, the lower clip 84 can have a longitudinal length greater than the separation distance. This allows the threaded fasteners 74a, 74b to pass through the lower mounting plate orifices 88a, 88b, the lower apertures 56, and be secured in the clip orifices 78a, 78b.

As will be understood, the engagement members 42a, 42b, 46a, 46b, 50a, 50b, can be included or excluded from either or both of the plate members 16, 24. In either case, the presence of the engagement members 42a, 42b, 46a, 46b, 50a, 50b does not preclude the plate member 16, 24 from being a clear rail so long, when the threaded fasteners 74 are partially loosened, as the mounting plate-clip (64, 70, 84) assembly can slide continuous from adjacent the vehicle mount 36 to an end of the planter bar 12 and, in some cases, off the planter bar 12.

In one method, a first planting unit 60 can be secured to the planter 12 by passing a pair of threaded fasteners 74 through the upper mounting plate orifices 76a, 76b and partially securing the threaded fasteners 74 in the clip orifices 78 of the upper clip 70. The upper clip 70 can then be placed over the upper, trailing rail 20. A pair of threaded fasteners 74 can then be inserted through the lower mounting plate orifices 88a, 88b, and partially secured in the clip orifices 78 of the lower clip 84. The mounting plate 64 can then slide to the appropriate location and then the threaded fasteners 74 tightened to firmly secure the mounting plate 64 and the planter unit 60 to the planter 12. This process can be repeated with additional planting units 60 at the desired spacing distance.

Once the planting units 60 are attached to the planter 12, if a row spacing change is desired, the threaded fasteners 74 just need to the partially loosened, the planting unit(s) 60 repositioned consistent with the new spacing, and the threaded fasteners 74 tightened to secure the planting unit(s) 60 in place.

In some embodiments, such as those shown in FIGS. 14 & 16-19, the mounting plate 64 is adapted to include upper mounting plate orifices 76a, 76b positioned to align with any of the engagement pairs 42a, 42b, 46a, 46b, 50a, 50b, which are spaced by the same separation distance $X_1$, $X_2$, $X_3$. The upper mounting place orifices 76a, 76b being adapted to receive portions of the upper fasteners 68. The upper fastener(s) 68 and lower fastener(s) 80 can be threaded fastener(s) 74.

In some embodiments, the upper mounting plate orifices 76a, 76b can be threaded, while the upper mounting plate orifices 76a, 76b can be unthreaded in other embodiments. In embodiments where the upper mounting plate orifices 76a, 76b are not threaded, the threaded fastener 74 can pass through an upper mounting plate orifice 76a, 76b and the upper apertures 54, and be secured by a nut 90. In embodiments where the upper mounting plate orifices 76a, 76b are threaded, each threaded fastener 74 can pass through the upper apertures 54 and be secured by the respective upper mounting plate orifice 76a, 76b.

Similarly, in some embodiments, the lower mounting plate orifices 88a, 88b can be threaded, while the lower mounting plate or ices 88a, 88b can be unthreaded in other embodiments. In embodiments where the lower mounting plate orifices 88a, 88b are not threaded, the threaded fastener 74 passing through an lower mounting plate orifice 88a, 88b and the lower aperture 56 can be secured by a nut 90. In embodiments where the upper mounting plate orifices 88a, 88b are threaded, each threaded fastener 74 passing through a lower aperture 56 can be secured by the respective lower mounting plate orifice 88a, 88b. In some embodiments, the upper apertures 54 are notches 58, while the lower apertures 56 are orifices.

In some embodiments, the lower apertures 56 are disposed vertically below the corresponding apertures 54 of the first and second engagement pairs 42, 46. As shown in FIGS. 16-19, in some embodiments, the upper mounting plate orifices 76a, 76b and the lower mounting plate orifices 88a, 88b are positioned to correspond with an engagement pair 42, 46, 50 and the corresponding lower apertures 56.

Figure 14A:
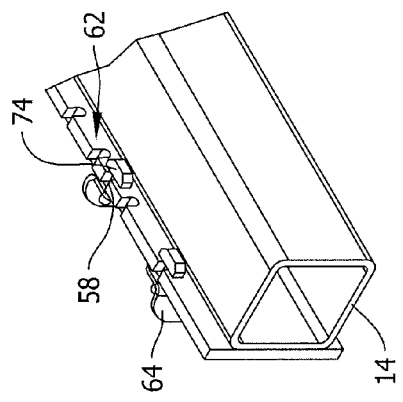
FIGS. 14A to 14D are perspective views of a planter bar described herein.
Figure 14C:
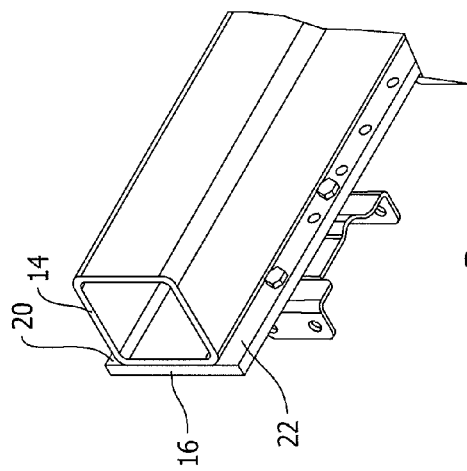
Figure 14B:
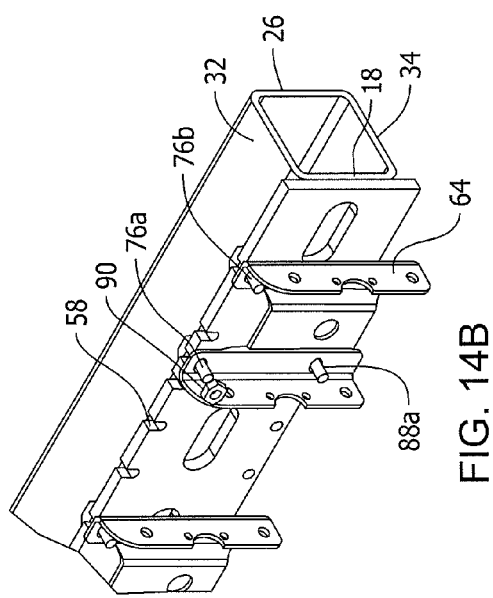
Figure 14D:
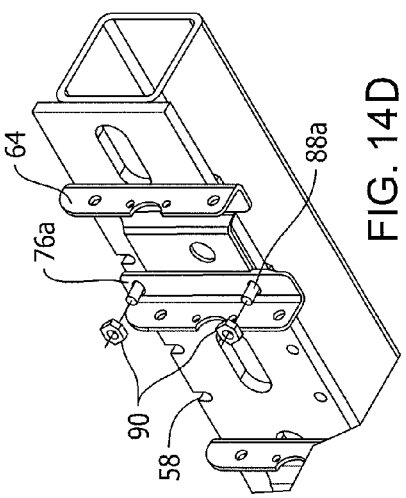
Figure 15A:
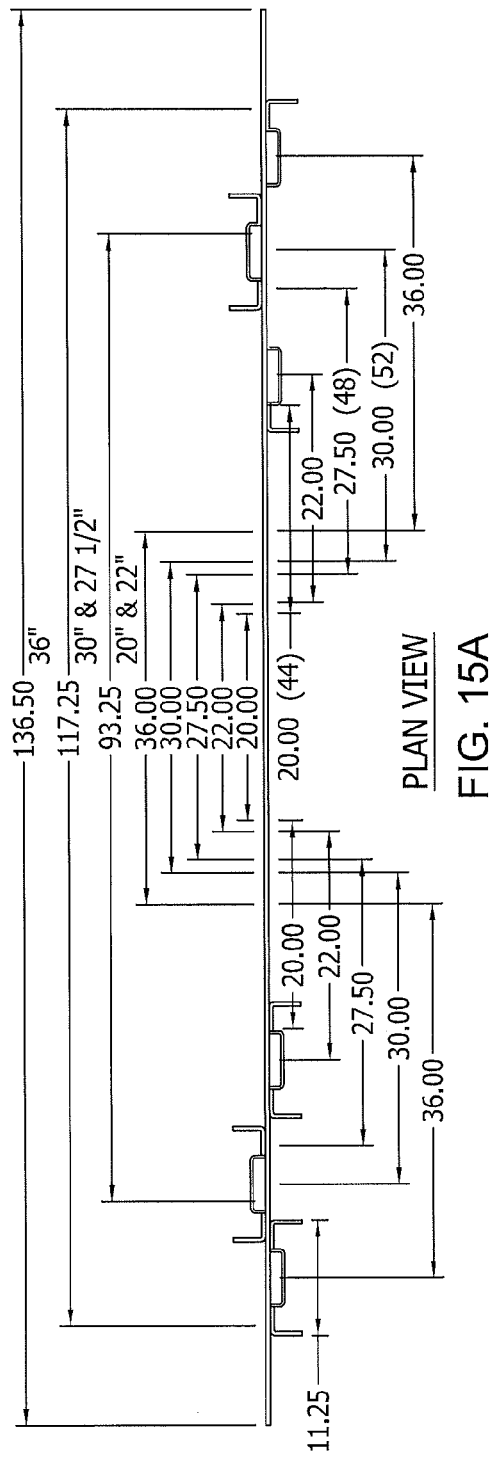
FIGS. 15A and 15B are plan and front views of a planter bar and mounting plate arrangements as described herein.
Figure 15B:
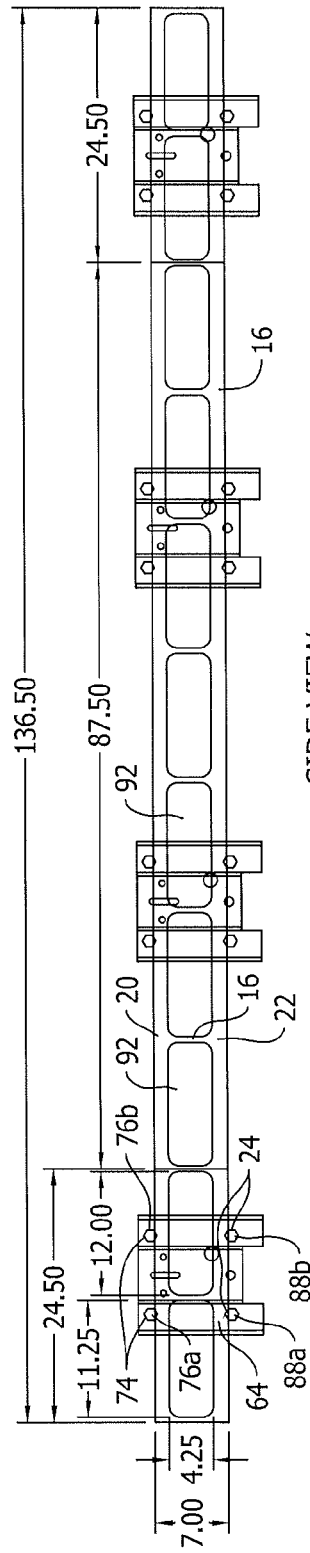

The threaded fastener 74 can be a bolt, for example a standard hex bolt, as shown in FIGS. 1, 2B, 4 & 9, a t-bolt, as shown in FIG. 14A, 14B, or any other appropriate fastener.

In one method, a first planting unit 60 can be secured to the planter 12. The can be done by passing a pair of threaded fasteners 74 into the upper mounting plate orifices 76a, 76b and partially securing the threaded fasteners 74 using a nut 90 or a threaded upper mounting plate orifices 76a, 76b. The protruding fasteners 74 can then be placed into a pair of notches 58 corresponding to the appropriate engagement pair 42, 46, 50 to achieve the desired spacing. A pair of threaded fasteners 74 can then be inserted through the lower mounting plate orifices 88a, 88b and the corresponding lower apertures 56 and the threaded fasteners 74 secured by a nut 90 or within threaded lower mounting plate orifices 88a, 88b. The threaded fasteners 74 can then be tightened to firmly secure the mounting plate 64 and the planter unit 60 to the planter 12. This process can be repeated with additional planting units 60 at the desired spacing distance.

Figure 11:
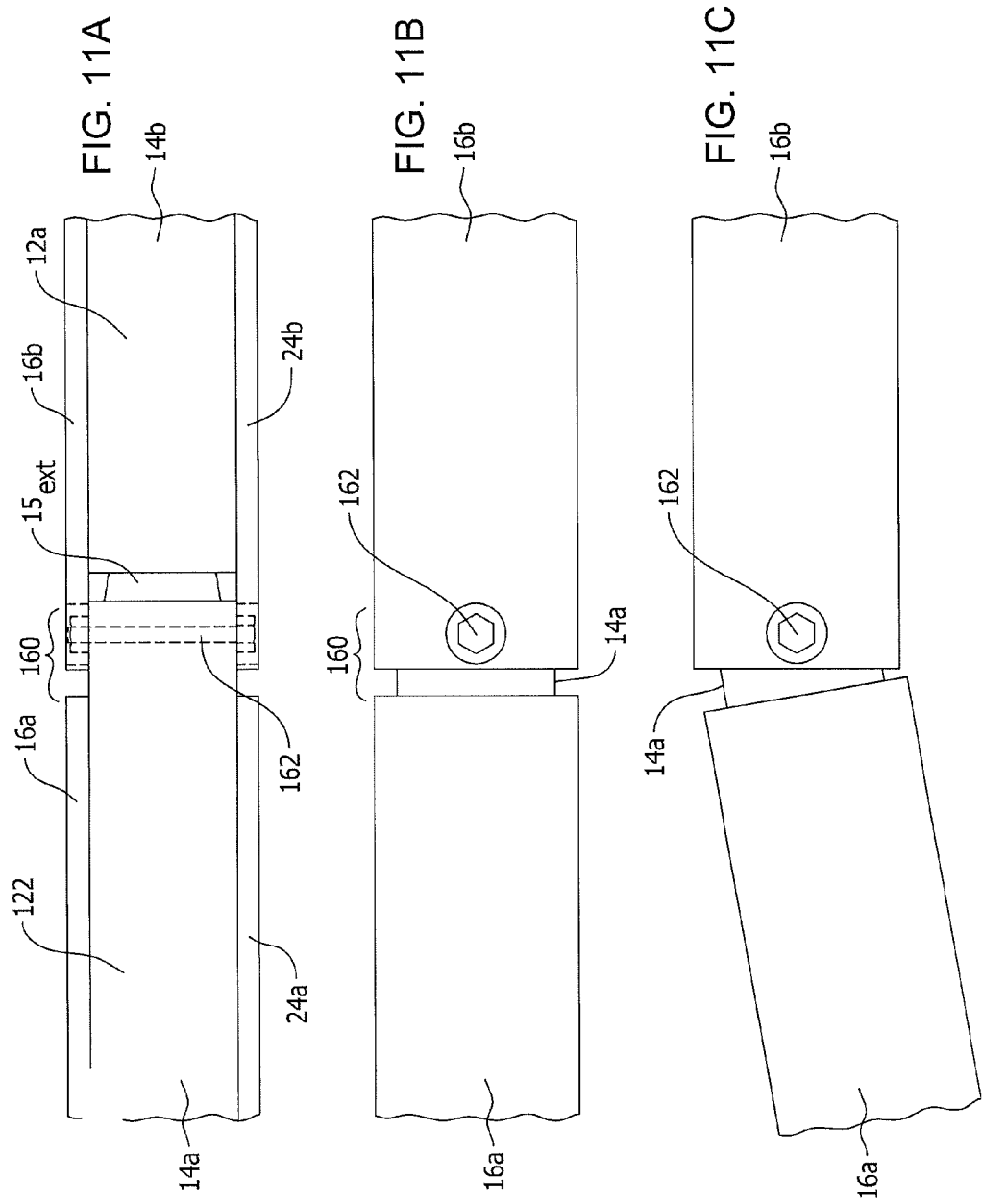

As will be understood, multi-row planer systems can range in width from 20' to over 100'. Over such a distance, fields frequently undulate. In some embodiments, the planter bar 12 include flex points 160 that allow adjacent portions of the planter bar 12 to pivot relative to one another. For example, FIG. 11 shows an arrangement that allows adjacent portions of the planter bar 12a, 12b to pivot up to approximately 15-20° relative to one another. In such an embodiment, the support bar 14a of the first planter bar portion 12a extends beyond the ends of the first and second plate members 16a, 24a of the first planter bar portion 12a, while the first and second plate members 16b, 24b of the second planter bar portion 12b extend beyond the end of the support bar 14b of the second planter bar section 12b. In some embodiments, the first and second plate members 16b, 24b of the second planter bar portion 12b and the support bar 14a of the first planter bar portion 12a include orifices that align with each other to allow a fastener 162 to pass through them, which functions as the flex point 160. In some embodiments, the fastener 162 is counter-sunk into one or both of the plate members 16b, 24b in order to maintain clear rails 20, 22, 28, 30 that are free of obstructions. In some embodiments, there is a space between adjacent portions of the first and second plate members 16a-16b, 24a-24b and between adjacent portions of the support bar 14a, 14b when the fastener 162 secures the portions of the feeder bar 12a-12b together. In some embodiments, the conduits within the support bar portions 14a, 14b are connected by an external conduit $15_{ext}$ extending between the adjacent support bar portions 14a, 14b. In some embodiments, the fastener 162 is a threaded fastener secured by a nut, while the fastener 162 can include a hole at the end and be secured by a pin in other embodiments.

In some embodiments, the moveable farming unit 60 is a planter unit 60a, which can include the mounting plate 64, a hopper 94 and dispensing portion, and a lifting portion 96. The moveable farming units 60 can also include fertilizer units 60b, wheels 60c, and other farming units that may need to be adjusted depending on the spacing between adjacent rows of crops. As shown in FIG. 4, in some embodiments, moveable farming units 60 can be adjustably attached to each side of the planter bar 12. For example, wheels 60c can be attached to the rails 28, 30 on the leading side of the planter bar 12, while planter units 60a can be attached to the rails 20, 22 on the trailing side of the planter bar 12. In other embodiments, fertilizer units 60b can be attached to the rails 28, 30 on the leading side of the planter bar 12, while planter units 60a can be attached to the rails 20, 22 on the trailing side of the planter bar 12. In some embodiments, the fertilizer trench produced by the fertilizer units 60b can be slightly offset from the seed line laid down by the planter unit 60a. Using the clear rail embodiments described herein, the distance between the seed line and the fertilizer trench can be universally adjustable (e.g., 1" apart, or 2" apart, or 3" apart, and on either side of the seed line).

Methods of using and operating the multi-row planter system 10 as described herein are also envisioned.

Any and all values or scales in the drawings are merely examples and are not meant to be limiting.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A multi-row planter system, comprising:
    a planter bar, comprising:
        a horizontal support bar,
        a first spacer permanently coupled to a trailing side of the support bar,
        a first plate member permanently coupled to a trailing side of the first spacer,
        at least one planting unit coupled to said planter bar by an inside surface of the upper, trailing rail and an inside surface of the lower, trailing rail, and
        wherein an upper portion of the support bar extends above the first spacer, and a lower portion of the support bar extends below the first spacer, and
        wherein the first plate member forms an upper, trailing rail extending above the first spacer, and a lower, trailing rail extending below the first spacer.

2. The multi-row planter system according to claim 1, further comprising a second spacer permanently coupled to a leading side of the support bar,
    a second plate member permanently coupled to a leading side of the second spacer, wherein an upper portion of the support bar extends above the first spacer, and a lower portion of the support bar extends below the first spacer, wherein said leading side is opposite said trailing side, and wherein said second plate member forms an upper, leading rail extending above the second spacer, and a lower, trailing rail extending below the second spacer.

3. The multi-row planter system according to claim 1, wherein said multi-row planter has a leading side and a trailing side opposite said leading side, said multi-row planter adapted for coupling to a vehicle positioned proximate said leading side.

4. The multi-row planter system according to claim 1, wherein the at least one planting unit comprises a mounting plate adjacent an outside surface of the first plate member and at least one upper fastener and at least one lower fastener, wherein each upper fastener comprises an upper fastener base portion adapted for extending from the mounting plate and an upper fastener clipping portion extending outwardly from the base portion, said clipping portion contacting the inside surface of the upper, trailing rail, and each lower fastener comprises an lower fastener base portion adapted for extending from the mounting plate and an upper fastener clipping portion extending outwardly from the base portion, said clipping portion contacting the inside surface of the lower, trailing rail.

5. The multi-row planter system according to claim 4, wherein each upper fastener is coupled to the mounting plate by at least one faster passing through an opening in the upper fastener clipping portion, and each lower fastener is coupled to the mounting plate by at least one fastener passing through an opening in the lower fastener clipping portion.

6. The multi-row planter system according to claim 1, wherein a majority of the first plate member on each side of a mid-point of the planter bar comprises a continuous clear rail.

7. The multi-row planter system according to claim 1, wherein said horizontal support bar comprises:
a surface selected from a top surface and a bottom surface;
at least one opening that extends through said surface; and
at least one vacuum member that is positioned on said at least one opening such
that said at least one vacuum member extends outwardly from said surface, wherein said at least one vacuum member is configured to facilitate transport of a fluid through said horizontal support bar.

8. The multi-row planter system according to claim 7, wherein said at least one opening comprises a plurality of openings and wherein said at least one vacuum member comprises a plurality of vacuum members that are positioned over the plurality of openings such that each of said plurality of vacuum members is positioned on a different opening of said plurality of openings.

9. The multi-row planter system according to claim 8, wherein said plurality of openings comprises a master opening positioned on a center portion of said surface and a plurality secondary apertures positioned on to either side of the master opening, and said plurality of vacuum members comprises a master vacuum member that is positioned over the master openings and a plurality of secondary vacuum members that are positioned over said plurality of secondary openings such that each of said plurality of secondary vacuum members is positioned over a different side aperture of said plurality of secondary openings.

10. The multi-row planter system according to claim 9, wherein said plurality of secondary openings and corresponding plurality of secondary vacuum members are positioned along the surface such that an equal number of secondary openings and corresponding secondary vacuum members are on each side to the master aperture and the master vacuum member.

11. The multi-row planter system according to claim 4, wherein each upper fastener base portion comprises a plurality of apertures that extend through said base portion; and
each upper fastener clipping portion comprises a first end comprising a plurality of tabs, wherein said plurality of apertures of the upper fastener base portion are configured to receive said plurality of tabs of the upper fastener clipping portion therein such that each of said plurality of tabs is positioned within a different aperture of said plurality of apertures.

12. The multi-row planter system of claim 11, wherein each upper fastener clipping portion and each lower fastener clipping portion comprises at least two clip orifices that are positioned between said first end and said second end, said at least two clip orifices are configured to concentrically align with corresponding mounting plate orifices in said mounting plate when said upper clip is coupled to said mounting plate by the at least one anchor projection.

13. The multi-row planter system of claim 4, wherein the at least one upper fastener comprises an upper clip comprising:
an upper fastener base portion comprising at least one anchor projection, and
wherein said mounting plate comprises at least one anchor opening that is configured to receive said at least one anchor projection therein to facilitate coupling said upper fastener to the mounting plate.

14. The multi-row planter system according to claim 4, wherein each lower fastener base portion comprises at least one anchor projection, and said mounting plate comprises at least one upper anchor opening that is configured to receive said at least one anchor projection of the upper fastener base portion therein to facilitate coupling said upper fastener to the mounting plate, and
each lower fastener base portion comprises at least one anchor projection, and said mounting plate comprises at least one lower anchor opening that is configured to receive said at least one anchor projection of the lower fastener base portion therein to facilitate coupling said upper fastener to the mounting plate.

15. The multi-row planter system according to claim 4, wherein each upper fastener base portion comprises a plurality of apertures that extend through said base portion; and
each upper fastener clipping portion comprises a first end comprising a plurality of tabs, wherein said plurality of apertures of the upper fastener base portion are configured to receive said plurality of tabs of the upper fastener clipping portion therein such that each of said plurality of tabs is positioned within a different aperture of said plurality of apertures.

16. The multi-row planter system according to claim 1, wherein a leading surface of the first spacer is permanently coupled to a trailing surface of the support bar, and a leading surface of the first plate member is permanently coupled to a trailing surface of the first spacer.

* * * * *